(12) United States Patent
Park et al.

(10) Patent No.: US 11,258,131 B2
(45) Date of Patent: Feb. 22, 2022

(54) BATTERY MODULE INCLUDING MODULE HOUSING

(71) Applicant: LG CHEM, LTD., Seoul (KR)

(72) Inventors: Geon-Tae Park, Daejeon (KR); Seok-Won Jeung, Daejeon (KR); Ju-Hwan Baek, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 195 days.

(21) Appl. No.: 16/701,713

(22) Filed: Dec. 3, 2019

(65) Prior Publication Data

US 2020/0203686 A1   Jun. 25, 2020

(30) Foreign Application Priority Data

Dec. 21, 2018 (KR) .......................... 10-2018-0167911

(51) Int. Cl.

| | |
|---|---|
| *H01M 50/291* | (2021.01) |
| *H01M 10/04* | (2006.01) |
| *H01M 50/249* | (2021.01) |
| *H01M 50/242* | (2021.01) |
| *H01M 10/613* | (2014.01) |

(Continued)

(52) U.S. Cl.

CPC ..... *H01M 50/291* (2021.01); *H01M 10/0422* (2013.01); *H01M 10/613* (2015.04); *H01M 10/625* (2015.04); *H01M 10/643* (2015.04); *H01M 10/6555* (2015.04); *H01M 50/213* (2021.01); *H01M 50/242* (2021.01); *H01M 50/249* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 2008/0314792 | A1 | 12/2008 | Daeschler et al. |
| 2010/0047676 | A1* | 2/2010 | Park ...................... H01M 10/48 429/93 |

(Continued)

FOREIGN PATENT DOCUMENTS

| | | |
|---|---|---|
| KR | 10-2011-0062988 A | 6/2011 |
| KR | 10-2012-0107371 A | 10/2012 |

(Continued)

OTHER PUBLICATIONS

Office Action dated Feb. 17, 2021, issued in corresponding Korean Patent Application No. 10-2018-0167911.

*Primary Examiner* — Gregg Cantelmo

(74) *Attorney, Agent, or Firm* — Morgan, Lewis & Bockius LLP

(57) ABSTRACT

Disclosed is a battery module that reduces damage of internal components during an assembling process and enhances the manufacturing efficiency. The battery module includes a plurality of cylindrical battery cells arranged in a horizontal direction and each standing upright in a vertical direction; and a module housing including outer sidewalls configured to form an inner space, a plurality of hollow tubes having inner sidewalls located in the inner space and extending in the vertical direction to accommodate the plurality of cylindrical battery cells therein, and a cavity formed by opening at least a part of vertical central portions of the inner sidewalls of the plurality of hollow tubes to form an empty space therein.

9 Claims, 11 Drawing Sheets

(51) Int. Cl.
*H01M 10/625* (2014.01)
*H01M 10/643* (2014.01)
*H01M 10/6555* (2014.01)
*H01M 50/213* (2021.01)

(56) References Cited

U.S. PATENT DOCUMENTS

| | | | |
|---|---|---|---|
| 2010/0221590 A1* | 9/2010 | Reber | B25F 5/02 |
| | | | 429/99 |
| 2011/0039142 A1* | 2/2011 | Kwag | G01V 3/12 |
| | | | 429/99 |
| 2011/0135993 A1 | 6/2011 | An et al. | |
| 2013/0082659 A1* | 4/2013 | Kano | H01M 50/213 |
| | | | 320/128 |
| 2013/0316202 A1 | 11/2013 | Bang et al. | |
| 2014/0193684 A1 | 7/2014 | Kwag | |
| 2015/0118529 A1* | 4/2015 | Ahn | H01M 10/6562 |
| | | | 429/72 |
| 2016/0322614 A1* | 11/2016 | Kim | H01M 50/502 |
| 2017/0092909 A1* | 3/2017 | Motokawa | H01M 10/613 |

FOREIGN PATENT DOCUMENTS

| | | |
|---|---|---|
| KR | 10-2014-0090459 A | 7/2014 |
| KR | 10-2015-0121987 A | 10/2015 |
| KR | 10-2017-0011206 A | 2/2017 |
| KR | 10-1919943 B1 | 11/2018 |

* cited by examiner

BATTERY MODULE INCLUDING MODULE HOUSING

The present application claims priority to Korean Patent Application No. 10-2018-0167911 filed on Dec. 21, 2018 in the Republic of Korea, the disclosures of which are incorporated herein by reference.

BACKGROUND

Technical Field

The present disclosure relates to a battery module including a module housing, and more particularly, to a battery module that reduces damage of internal components during an assembling process and enhances the manufacturing efficiency.

Discussion of the Related Art

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. In addition, the lithium secondary battery includes an electrode assembly in which a positive electrode plate coated with the positive electrode active material and a negative electrode plate coated with the negative electrode active material are disposed with a separator being interposed therebetween, and an exterior, namely a battery exterior, hermetically containing the electrode assembly together with an electrolyte.

In recent years, secondary batteries have been widely used not only in small-sized devices such as portable electronic devices but also in medium-sized or large-sized devices such as vehicles and power storage devices. When the secondary batteries are used in the middle-sized or large-sized devices, a large number of secondary batteries are electrically connected to increase capacity and power. In particular, secondary batteries are widely used for the middle-sized or large-sized devices since they may be easily stacked.

Meanwhile, recently, as the need for a large-capacity structure increases along with the utilization as an energy storage source, the demand for a battery pack in which a plurality of battery modules, each having a plurality of secondary batteries electrically connected in series and/or in parallel, increases.

In addition, the battery module generally includes a module housing made of plastic in order to protect or store a plurality of secondary batteries against external shocks. For example, an accommodation portion may be separately formed in the module housing to accommodate the plurality of secondary batteries.

However, in the related art, when the battery module is charged or discharged, a central portion of a battery can of the cylindrical battery cell may be inflated due to the swelling phenomenon of the electrode assembly, which is an internal component of the mounted cylindrical battery cell, or the size of the battery can may increase as the temperature of the battery can rises. At this time, if the accommodation portion of the module housing accommodating the cylindrical battery cell surrounds the outer surface of the central portion of the cylindrical battery cell, the accommodation portion may pressurize the cylindrical battery cell, thereby greatly increasing the internal pressure of the cylindrical battery cell. Accordingly, the battery module according to the related art has a problem that the electrode assemblies of the plurality of cylindrical battery cells mounted therein are seriously distorted.

In addition, in the manufacturing process of the battery module of the prior art, while the plurality of cylindrical battery cells are being inserted and mounted in the module housing, if the insertion positions of the plurality of cylindrical battery cells may be deviated or the insertion directions thereof are wrong, inadequate insertion may occur, which results in interruption of the manufacturing operation. Accordingly, it is difficult to manufacture battery module manually or through an automation process, and the manufacturing time increases.

SUMMARY

Accordingly, embodiments of the present disclosure are directed to a battery module including a module housing that substantially obviates one or more of the problems due to limitations and disadvantages of the related art.

The present disclosure is designed to solve the problems of the related art, and therefore the present disclosure is directed to providing a battery module, which may reduce damage of internal components during an assembling process and enhance the manufacturing efficiency.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

In one aspect of the present disclosure, there is provided a battery module, comprising: a plurality of cylindrical battery cells arranged in a horizontal direction and standing upright in a vertical direction; and a module housing including outer sidewalls configured to form an inner space, a plurality of hollow tubes having inner sidewalls located in the inner space and extending in the vertical direction to accommodate the plurality of cylindrical battery cells therein, and a cavity formed by opening at least a part of vertical central portions of the inner sidewalls of the plurality of hollow tubes to form an empty space therein.

Also, the module housing may include an upper case having a plurality of upper hollow tubes configured to accommodate an upper portion of the plurality of cylindrical battery cells; and a lower case having a plurality of lower hollow tubes configured to accommodate a lower portion of the plurality of cylindrical battery cells.

Further, the cavity may include a first recessed structure formed by denting at least a part of a lower surface of the upper hollow tube upward and a second recessed structure formed by denting a part of an upper surface of the lower hollow tube downward.

Also, the module housing may include a guide unit formed in the cavity to guide the plurality of cylindrical battery cells to be inserted into the plurality of hollow tubes.

Further, the guide unit may include a first cylinder located at the upper case and having a cylindrical form protrusively extending toward the lower case; and a second cylinder located at the lower case and having a cylindrical form protrusively extending toward the upper case.

In addition, the cylindrical form may have a cylinder diameter gradually decreasing toward a terminal portion at which the cylindrical form protrusively extends.

Also, a terminal portion of the cylindrical form at which the cylindrical form protrusively extends may be rounded or chamfered at an edge thereof.

Moreover, the battery module may further comprise a cooling member disposed in the space of the cavity.

In addition, the module housing may include at least one fixing tube extending in the vertical direction.

Further, the battery module may further comprise a bushing inserted into the fixing tube.

Also, the cooling member may be connected to the bushing and extend in the horizontal direction from an outer surface of the bushing to contact an outer surface of the plurality of cylindrical battery cells.

Further, the cooling member may include a guide protrusion protrusively extending inward and having a cylindrical form to guide the cylindrical battery cells to be inserted into the hollow tubes.

In another aspect of the present disclosure, there is also provided a battery pack, comprising at least one battery module as described above.

In another aspect of the present disclosure, there is also provided a vehicle, comprising the battery pack.

According to an embodiment of the present disclosure, since the battery module has a cavity with an empty space formed inside the module housing, during charging and discharging of the battery module, it is possible to avoid that the cylindrical battery cell is pressed by the hollow tube formed at the module housing due to the internal temperature rise or the change of size of the battery can caused by the swelling phenomenon of the internal electrode assembly, thereby effectively preventing the electrode of the cylindrical battery cell from being distorted.

Also, according to an embodiment of the present disclosure, since a stopper and a fixing protrusion are provided to each of the upper case and the lower case, it is possible to prevent the plurality of cylindrical battery cells accommodated inside the module housing from being separated to the outside of the module housing. Moreover, in the present disclosure, it is possible to stably fix the plurality of cylindrical battery cells accommodated in the module housing from moving due to frequent external shocks.

Further, according to an embodiment of the present disclosure, since a guide unit is formed in the cavity of the module housing, it is possible to guide a moving direction of the plurality of cylindrical battery cells inserted into the plurality of hollow tubes, thereby reducing the insertion failure of the cylindrical battery cells. As a result, misassembling may be reduced, thereby shortening the manufacturing time and greatly reducing the production cost of the product.

In addition, according to an embodiment of the present disclosure, since the guide unit includes a first cylinder and a second cylinder, it is possible to have a suitable shape capable of guiding the plurality of cylindrical battery cells to be inserted into the plurality of hollow tubes and shorten the manufacturing process of the battery module.

Further, according to an embodiment of the present disclosure, since the first cylinder or the second cylinder have a diameter gradually decreasing toward a terminal portion at which the cylindrical form protrusively extends, even when the insertion direction of the plurality of cylindrical battery cells is not vertical but inclined, the plurality of cylindrical battery cells may be properly guided to be inserted into the plurality of hollow tubes along the horizontal outer surfaces of the first cylinder or the second cylinder.

In addition, according to an embodiment of the present disclosure, since the first cylinder or the second cylinder is rounded or chamfered at an edge of the terminal portion at which the cylindrical shape protrusively extends, when the end of the plurality of cylindrical battery cells collides with the terminal portion of the first cylinder or the second cylinder, the plurality of cylindrical battery cells may be properly guided to be smoothly inserted into the plurality of hollow tubes along the outer surface of the first cylinder or the second cylinder. Accordingly, it is possible to effectively prevent the damage of the plurality of cylindrical battery cells, which may occur in the process of inserting the plurality of cylindrical battery cells into the plurality of hollow tubes of the module housing, thereby improving the yield of the battery module.

Further, according to an embodiment of the present disclosure, since a cooling member disposed in the space of the cavity is further provided, the heat generated from the plurality of cylindrical battery cells during the charging and discharging of the battery module may be effectively absorbed and transferred quickly to the outer sidewall of the housing. Accordingly, the battery module of the present disclosure may effectively extend the battery life by improving the heat dissipation characteristics.

In addition, according to an embodiment of the present disclosure, since a body portion of the cooling member is connected to the bushing and extends in the horizontal direction from the outer surface of the bushing to contact the outer surface of the plurality of cylindrical battery cells, when charging and discharging the battery module, the generated heat may be effectively transferred to the bushing with high thermal conductivity and large heat capacity. Accordingly, the cooling efficiency of the battery module may be effectively increased. Moreover, in the present disclosure, the mechanical stiffness of the module housing may be effectively increased by means of the cooling member connected to two or more bushings, thereby effectively reducing the damage of internal components due to impacts applied to the battery module.

It is to be understood that both the foregoing general description and the following detailed description are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated in and constitute a part of this application, illustrate embodiments of the present disclosure and together with the description serve to explain features and principles of the present disclosure.

DETAILED DESCRIPTION

Hereinafter, embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
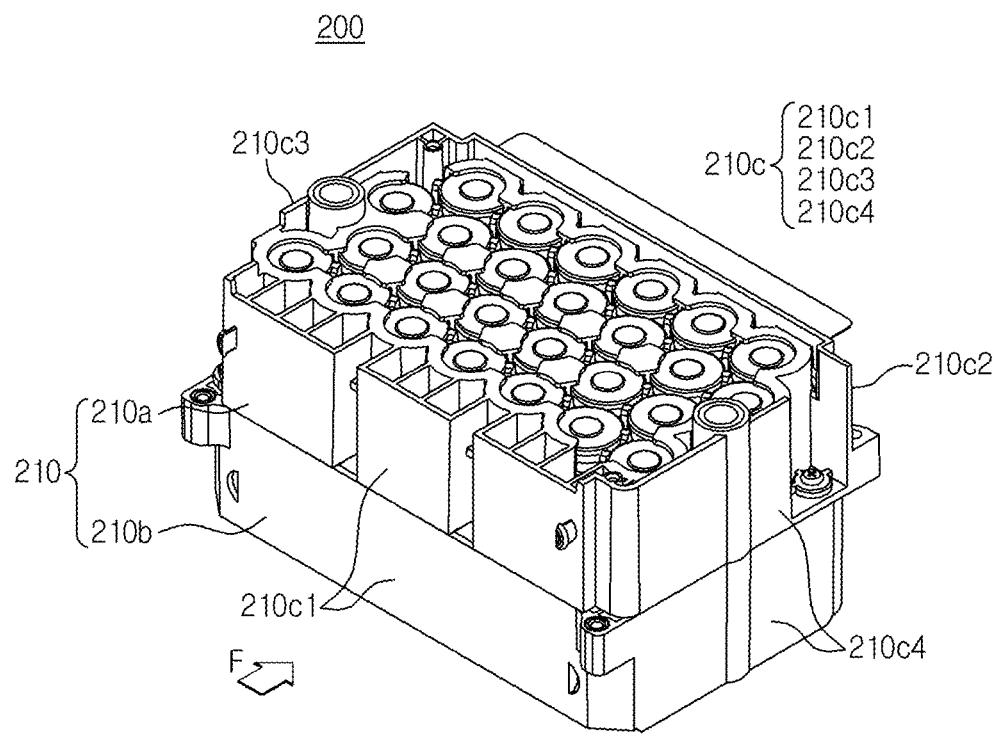
FIG. 1 is a perspective view schematically showing a battery module according to an embodiment of the present disclosure.
Figure 2:
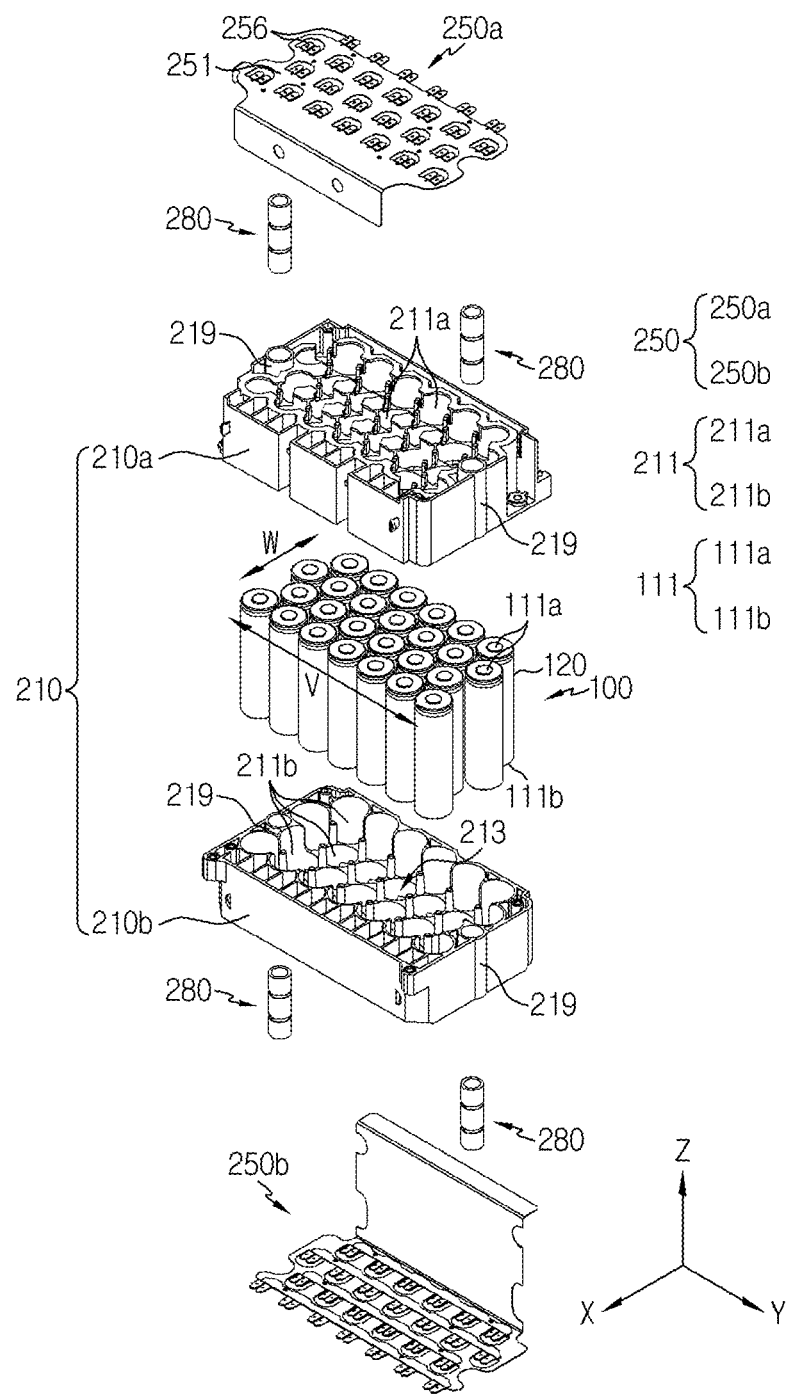
FIG. 2 is an exploded perspective view schematically showing some components of the battery module according to an embodiment of the present disclosure.

FIG. 1 is a perspective view schematically showing a battery module according to an embodiment of the present disclosure. FIG. 2 is an exploded perspective view schematically showing some components of the battery module according to an embodiment of the present disclosure. Also, FIG. 3 is a side sectional view schematically showing a cylindrical battery cell employed at the battery module according to an embodiment of the present disclosure.

Figure 3:
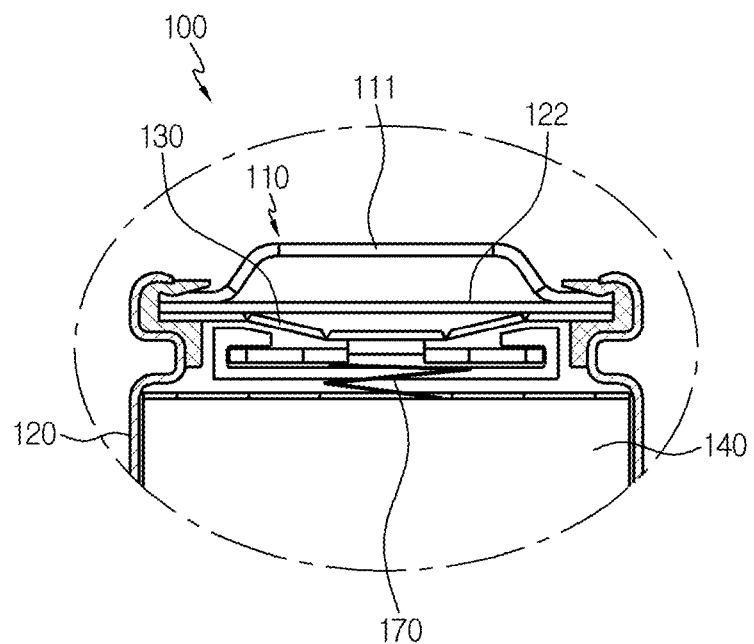
FIG. 3 is a side sectional view schematically showing a cylindrical battery cell employed at the battery module according to an embodiment of the present disclosure.

With reference to FIGS. 1 to 3, a battery module 200 according to an embodiment of the present disclosure may include a plurality of cylindrical battery cells 100, a current collection plate 250, and a module housing 210.

Specifically, the cylindrical battery cell 100 may include a cylindrical battery can 120 and an electrode assembly 140 (FIG. 3) accommodated in the battery can 120.

Here, the battery can 120 may include a material having high electric conductivity. For example, the battery can 120 may include an aluminum or copper material. Also, the battery can 120 may be configured to stand long in a vertical direction. In addition, when viewed in the F direction of FIG. 1, the battery can 120 may have a cylindrical shape extending in the vertical direction. Further, electrode terminals 111a, 111b may be formed at upper and lower portions of the battery can 120, respectively. Specifically, the first electrode terminal 111a protruding in the upper direction may be formed on a flat circular upper surface of the battery can 120, and the second electrode terminal 111b may be formed on a flat circular lower surface of the battery can 120.

Meanwhile, the terms indicating directions such as front, rear, left, right, upper and lower, used in this specification, may vary depending on the position of an observer or the shape of an object. However, in this specification, for convenience of description, the front, rear, left, right, upper and lower directions are distinguished based on the case where viewed in the F direction.

Further, the cylindrical battery cells 100 may be arranged in a plurality of columns and rows in the horizontal direction. Here, the horizontal direction may mean a direction parallel to the ground when the cylindrical battery cells 100 are placed on the ground, and may also be referred to as at least one direction on a plane perpendicular to the vertical direction. In addition, the plurality of cylindrical battery cells 100 may be accommodated in the module housing 210 to stand upright in the vertical direction.

For example, as shown in FIG. 2, the battery module 200 may include a plurality of cylindrical battery cells 100 arranged in four columns in the front and rear direction (W) and seven or six rows in the left and right direction (V).

In addition, the electrode assembly 140 (FIG. 3) may be rolled in a jelly-roll-type structure with a separator being interposed between a positive electrode and a negative electrode. Further, a positive electrode tab 170 may be attached to the positive electrode (not shown) and connected to the first electrode terminal 111a at the top of the battery can 120. In addition, a negative electrode tab (not shown) may be attached to the negative electrode (not shown) and connected to the second electrode terminal 111b at the bottom of the battery can 120.

With reference to FIG. 3 again along with FIG. 2, a portion of a top cap 110 of the cylindrical battery cell 100 protrudes to form the electrode terminal 111, and the portion of the top cap 110 is configured to be perforated when the internal gas reaches a specific pressure.

In addition, the cylindrical battery cell 100 may include a safety element 122 (for example, a positive temperature coefficient (PTC) element, a temperature cutoff (TCO) element, or the like) for blocking the current by greatly increasing the battery resistance when the temperature inside the battery cell rises. Also, the cylindrical battery cell 100 may include a safety vent structure (safety vent) 130 that protrudes downward in a normal state but is ruptured to exhaust gas when the pressure rises inside the battery.

However, the battery module 200 according to the present disclosure may employ various kinds of cylindrical battery cells 100 known at the time of filing of this application, without being limited to the above cylindrical battery cell 100.

In addition, the current collection plate 250 may be configured such that one surface of the current collection plate 250 contacts the electrode terminals 111 of at least two cylindrical battery cells 100 among the plurality of cylindrical battery cells 100. That is, the current collection plate 250 may be configured to electrically connect the plurality of cylindrical battery cells 100 to each other by contacting the first electrode terminal 111a or the second electrode terminal 111b of the plurality of cylindrical battery cells 100. Specifically, the current collection plate 250 may include a plate portion 251 and a connection portion 256.

Here, the plate portion 251 may have a plate shape with a top surface and a bottom surface that are relatively wider than the side surface thereof in the horizontal direction (the x direction or the y direction). In addition, the plate portion 251 may be located at an upper portion or a lower portion of the plurality of cylindrical battery cells 100 where the first electrode terminals 111a or the second electrode terminals 111b are formed.

Further, the connection plate 250 may include a first connection plate 250a located at the upper portion of the plurality of cylindrical battery cells 100 and electrically connected to the first electrode terminals 111a of the plurality of cylindrical battery cells 100. In addition, the connection plate 250 may include a second connection plate 250b located at the lower portion of the plurality of cylindrical battery cells 100 and electrically connected to the second electrode terminals 111b of the plurality of cylindrical battery cells 100.

Moreover, the connection plate 250 may include a metal having excellent electric conductivity. For example, the metal may be a copper alloy, an aluminum alloy or a nickel alloy.

Figure 4:
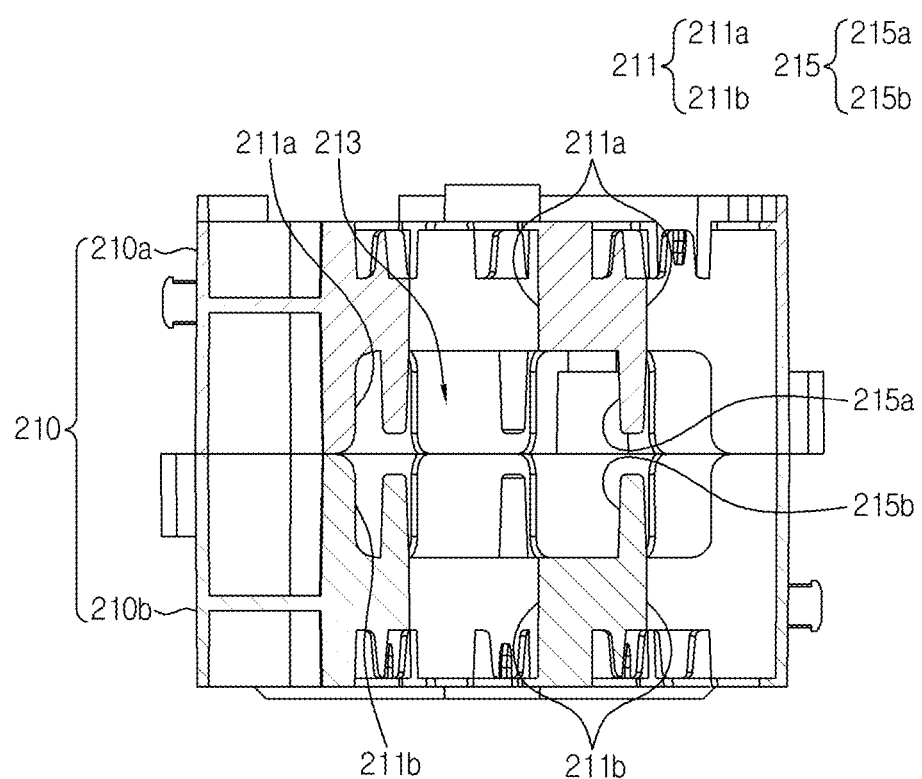
FIG. 4 is a side sectional view schematically showing a module housing employed at the battery module according to an embodiment of the present disclosure.

FIG. 4 is a side sectional view schematically showing a module housing employed at the battery module according to an embodiment of the present disclosure.

With reference to FIG. 4 along with FIGS. 1 and 2, the module housing 210 may include an outer sidewall 210c, a plurality of hollow tubes 211, and a cavity 213.

Specifically, the outer sidewall 210c of the module housing 210 is configured to form an inner space and may include a first outer sidewall 210c1, a second outer sidewall 210c2, a third outer sidewall 210c3 and a fourth outer sidewall 210c4 formed in front, rear, left and right directions.

For example, as shown in FIG. 1, the module housing 210 may include the outer sidewall 210c extending flat in the vertical direction. In addition, the first outer sidewall 210c1, the second outer sidewall 210c2, the third outer sidewall 210c3 and the fourth outer sidewall 210c4 may be formed to connect a front end, a rear end, a left end and a rear end of the module housing 210 to each other in a plan view. That is, the outer sidewalls 210c1, 210c2, 210c3, 210c4 may be provided such that the module housing 210 has a rectangular shape in a plan view.

In addition, the plurality of hollow tubes 211 may be located in the inner space formed by the outer sidewall 210c. That is, the plurality of hollow tubes 211 may be formed to be surrounded by the outer sidewall 210c in the horizontal direction. Moreover, the plurality of hollow tubes 211 may have a hollow sized to accommodate the plurality of cylindrical battery cells 100 therein. In other words, the plurality of hollow tubes 211 may have the inner sidewalls extending in the vertical direction to surround at least a portion of the horizontal outer surface of the plurality of cylindrical battery cells 100.

For example, as shown in FIGS. 1 and 2, the module housing 210 may include 26 hollow tubes 211 located in the inner space formed by the outer sidewall 210c. In addition, an inner sidewall extending in the vertical direction may be formed at each of the 26 hollow tubes 211. Also, the hollow tube 211 located at the outer side in the horizontal direction may have a structure connected to the outer sidewall 210c.

Further, the cavity 213 may be a portion where an empty space is formed in the module housing 210. Specifically, the cavity 213 may be formed by opening at least a part of vertical central portions of the inner sidewalls of the plurality of hollow tubes 211.

For example, as shown in FIG. 4, the cavity 213 may be formed by opening or removing at least a part of the vertical central portions of the inner sidewalls of the plurality of hollow tubes 211 so that the insides of the hollow tubes 211 are open to each other. That is, the cavity 213 may have a shared empty space by removing a part of the inner sidewalls of the plurality of hollow tubes 211 in the inner space of the outer sidewall 210c of the module housing 210. For example, the cavity 213 may have an approximately cuboid empty space formed inside the module housing 210.

Meanwhile, in the related art, when the battery module (not shown) is charged or discharged, the central portions of the battery cans 120 of the plurality of cylindrical battery cells 100 may be inflated due to the swelling phenomenon of the electrode assembly accommodated inside the cylindrical battery cell, or the size of the battery can 120 may increase as the temperature rises. For this reason, if the accommodation portion of the module housing accommodating the cylindrical battery cells 100 surrounds the outer surface of the cylindrical battery cells 100, the accommodation portion may pressurize the cylindrical battery cells 100. Which may significantly increases the internal pressure of the cylindrical battery cells 100. Accordingly, the battery module of the related art has a problem that the electrode assemblies inside the plurality of cylindrical battery cells 100 mounted therein are seriously distorted.

Thus, according to the configuration of the present disclosure, since the battery module 200 has the cavity 213 with an empty space inside the module housing 210, when the battery module is charged or discharged, it is possible to avoid that the vertical central portion of the cylindrical battery cell 100 is pressurized by the hollow tube 211 formed at the module housing 210 even when the size of the battery can 120 is changed due to the rise of the internal temperature or the change of size of the battery can 120, thereby effectively preventing the electrodes of the cylindrical battery cell 100 from being distorted.

Figure 5:
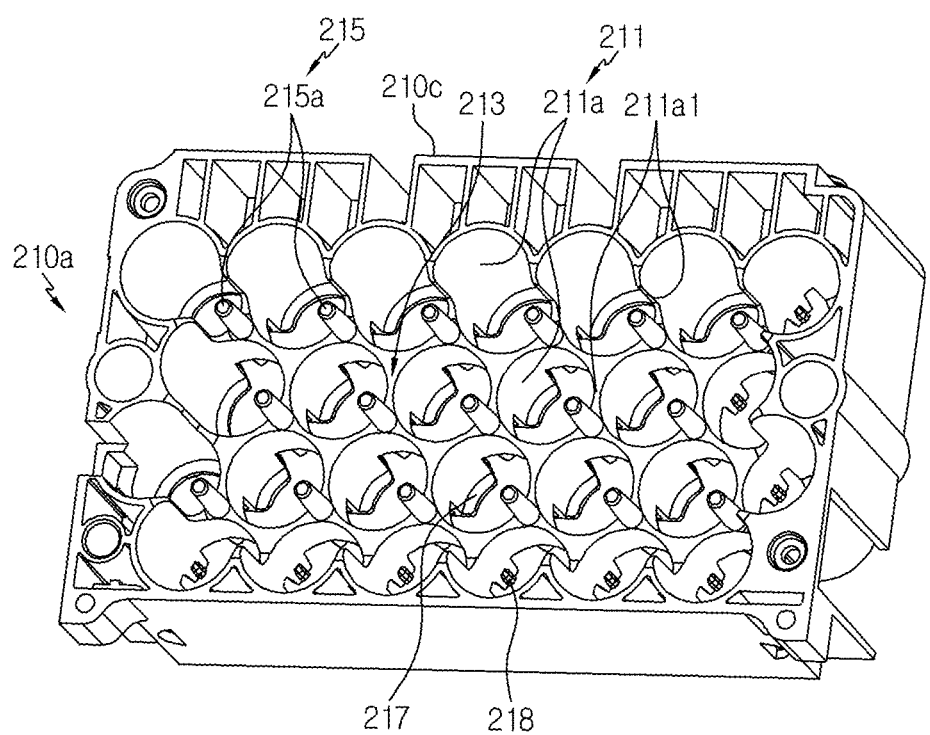
FIG. 5 is a bottom perspective view schematically showing an upper case employed at the battery module according to an embodiment of the present disclosure.

FIG. 5 is a bottom perspective view schematically showing an upper case employed at the battery module according to an embodiment of the present disclosure. Also, FIG. 6 is a perspective view schematically showing a lower case employed at the battery module according to an embodiment of the present disclosure.

Figure 6:
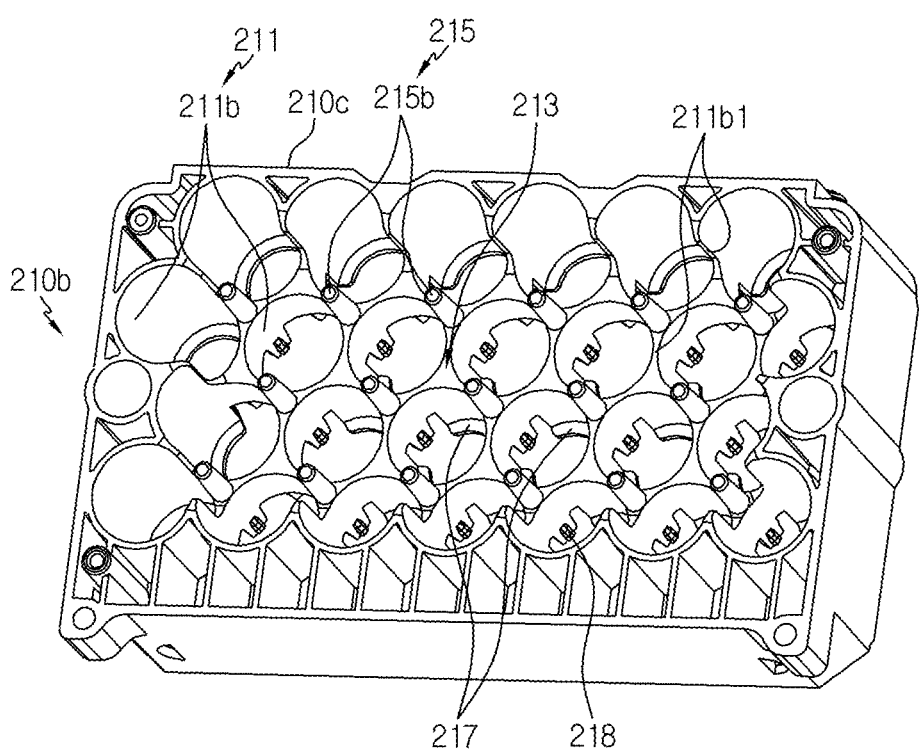
FIG. 6 is a perspective view schematically showing a lower case employed at the battery module according to an embodiment of the present disclosure.

With reference to FIGS. 5 and 6 along with FIG. 2, the module housing 210 may include an upper case 210a and a lower case 210b.

More specifically, the upper case 210a may include a plurality of upper hollow tubes 211a configured to accommodate an upper portion of the plurality of cylindrical battery cells 100. In addition, the upper hollow tubes 211a may be connected to the outer sidewall 210c of the module housing 210. Moreover, the inner sidewall of the upper hollow tube 211a may extend downward from the top surface of the upper case 210a.

In addition, a stopper 217 may be formed at an upper end of the upper hollow tube 211a to prevent the cylindrical battery cell 100 from moving further upward.

Also, a fixing protrusion 218 protruding toward the cylindrical battery cell 100 may be formed at the upper end of the upper hollow tube 211a to pressurize and fix the outer surface of the inserted cylindrical battery cell 100.

For example, as shown in FIG. 5, 26 upper hollow tubes 211a may be formed to accommodate the upper portions of the 26 cylindrical battery cells 100. Further, the stopper 217 and the fixing protrusion 218 may be formed at each of the 26 upper hollow tubes 211a.

In addition, the lower case 210b may include a plurality of lower hollow tubes 211b configured to accommodate the lower portion of the plurality of cylindrical battery cells 100. Also, the lower hollow tubes 211b may be connected to the outer sidewall 210c of the module housing 210. Moreover, the inner sidewall of the lower hollow tube 211b may extend upward from the lower surface of the lower case 210b. In addition, a stopper 217 may be formed at a lower end of the lower hollow tube 211b to prevent the cylindrical battery cell 100 from moving downward further. In addition, a fixing protrusion 218 protruding toward the cylindrical battery cell 100 may be formed at the lower end of the lower hollow tube 211b to pressurize and fix the outer surface of the inserted cylindrical battery cell 100.

For example, as shown in FIG. 6, 26 lower hollow tubes 211b may be formed to accommodate the lower portions of the 26 cylindrical battery cells 100. Further, the stopper 217 and the fixing protrusion 218 may be formed at each of the 26 lower hollow tubes 211b.

Thus, according to this configuration of the present disclosure, since the stopper 217 and the fixing protrusion 218 are formed at each of the upper case 210a and the lower case 210b, it is possible to prevent the plurality of cylindrical battery cells 100 accommodated in the module housing 210 from being separated out of the module housing 210. Moreover, in the present disclosure, the plurality of cylindrical battery cells 100 accommodated in the module housing 210 may be stably fixed not to move due to frequent external shocks.

With reference to FIGS. 4 and 5 again, the cavity 213 may include a first recessed structure 211a1 formed by denting at least a part of a lower surface of the upper hollow tube 211a upward. Further, the first recessed structure 211a1 may be formed by denting an entire lower surface of a partial upper hollow tube 211a located at an inner side, among the entire upper hollow tube 211a, upward (inward) further to the lowermost surface of the upper case 210a.

For example, as shown in FIG. 5, among the 26 upper hollow tubes 211a, 17 upper hollow tubes 211a located at the outer side in the horizontal direction have the first recessed structure 211a1 at which a part of the inner sidewall in the inner direction is dented inward (upward). That is, the first recessed structures 211a1 formed at the 17 upper hollow tubes 211a may have a stepped structure in an inward direction (an upper direction).

Also, as shown in FIG. 5, the remaining 9 upper hollow tubes 211a located at a relatively inner side may have the first recessed structure 211a1 at which the lower end of the upper hollow tube 211a is dented inward (upward) further to the lower surface of the upper case 210a as a whole. In other words, the 9 upper hollow tubes 211a may have a shorter vertical length than the 17 upper hollow tubes 211a as a whole.

With reference to FIGS. 4 and 6, the cavity 213 may include a second recessed structure 211b1 formed by denting at least a part of the upper surface of the lower hollow tube 211b downward. Moreover, the second recessed structure 211b1 may be formed by denting the entire lower surface of a partial lower hollow tube 211b, among the entire lower hollow tube 211b, downward (inward) further to the top surface of the lower case 210b.

For example, as shown in FIG. 6, among the 26 lower hollow tubes 211b, 17 lower hollow tubes 211b located at the outer side in the horizontal direction may have the second recessed structure 211b1 at which a part of the inner sidewall of the inner sidewall in the inner direction (a direction toward the center of the horizontal direction) inward (downward) is dented. That is, the second recessed structure 211b1 formed at the 17 lower hollow tubes 211b may have a stepped structure in an inward direction (a lower direction).

In addition, the remaining 9 lower hollow tubes 211b located at an relatively inner side may have the second recessed structure 211b1 in which the upper end of the lower hollow tube 211b is dented inward (downward) further to the lower surface of the upper case 210a as a whole. In other words, the 9 lower hollow tubes 211b located at the inner side may have a shorter vertical length than the 17 lower hollow tubes 211b located at the outer side as a whole.

With reference to FIGS. 4 to 6 again along FIG. 2, the module housing 210 may include a guide unit 215 configured to guide the plurality of cylindrical battery cells 100 to be inserted into the plurality of hollow tubes 211. Specifically, the guide unit 215 may be formed in the cavity 213. For example, the guide unit 215 may be formed at an inner surface of the cavity 213. In addition, the guide unit 215 may be formed to contact an inlet formed at the top or bottom surface of the hollow tube 211. Further, the guide unit 215 may have a protrusion shape extending inwardly from the hollow tube 211. In addition, the guide unit 215 may have a protrusion shape configured to contact the horizontal outer surface of the plurality of cylindrical battery cells 100 respectively inserted into the plurality of hollow tubes 211.

For example, as shown in FIG. 5, 17 guide units 215 protrusively extending inward (downward) from the bottom surface of the upper hollow tube 211a may be formed in the cavity 213 of the upper case 210a. Also, as shown in FIG. 6, 17 guide units 215 protrusively extending inward (downward) from the top surface of the lower hollow tube 211b may be formed in the cavity 213 of the lower case 210b.

Thus, according to this configuration of the present disclosure, since the guide unit 215 is formed in the cavity 213 of the module housing 210, it is possible to guide the movement direction in which the plurality of cylindrical battery cells 100 are inserted into the multiple of hollow tubes 211, thereby reducing the insertion failure of the cylindrical battery cells 100. As a result, the production cost of the product may be greatly reduced by shortening the manufacturing time.

Figure 7:
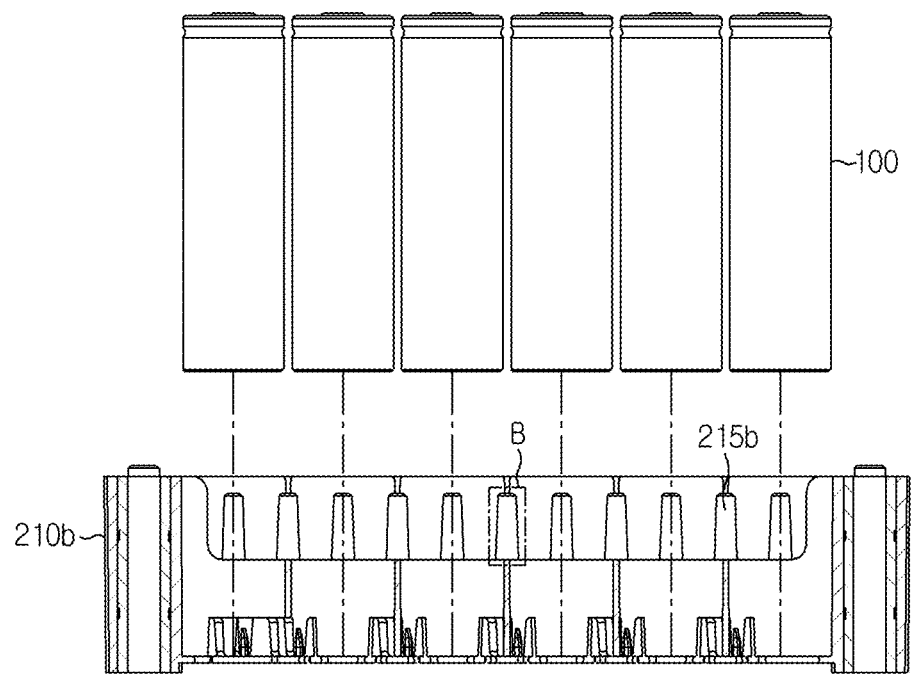
FIG. 7 is a side sectional view schematically showing that the plurality of cylindrical battery cells employed at the battery module according to an embodiment of the present disclosure are inserted into the lower case.

FIG. 7 is a side sectional view schematically showing that the plurality of cylindrical battery cells employed at the battery module according to an embodiment of the present disclosure are inserted into the lower case. Also, FIG. 8 is a side sectional view schematically showing that the upper case is coupled to the lower case employed at the battery module according to an embodiment of the present disclosure.

Figure 8:
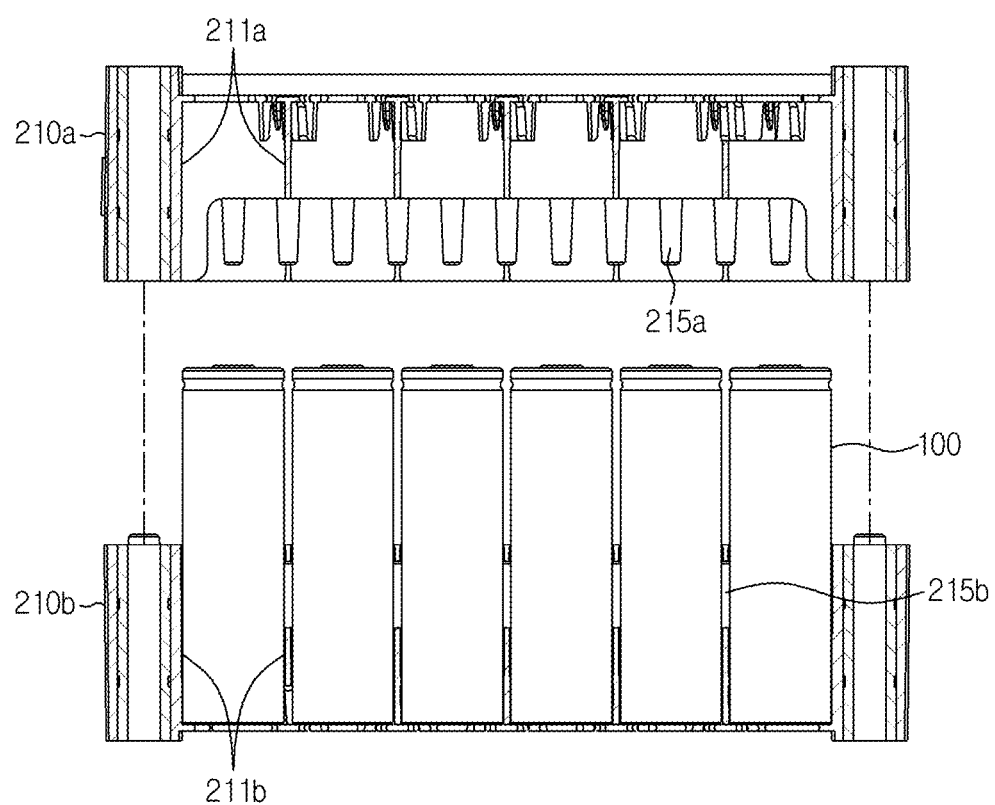
FIG. 8 is a side sectional view schematically showing that the upper case is coupled to the lower case employed at the battery module according to an embodiment of the present disclosure.

With reference to FIGS. 7 and 8 along with FIGS. 5 and 6, the guide unit 215 may include a first cylinder 215a and a second cylinder 215b.

Specifically, the first cylinder 215a may have a cylindrical form located at the upper case 210a to protrusively extend toward the lower case 210b. For example, as shown in FIG. 5, 17 first cylinders 215a of a cylindrical form protrusively extending downward may be formed at the first recessed structure 211a1 of the upper case 210a. In addition, the 17 first cylinders 215a may be located between the 26 upper hollow tubes 211a. Further, the outer surface of the first cylinder 215a may be connected to the inner surface of the upper hollow tube 211a.

Specifically, the second cylinder 215b may have a cylindrical form located at the lower case 210b to protrusively extend toward the upper case 210a. For example, as shown in FIG. 6, 17 second cylinders 215b of a cylindrical form protrusively extending upward may be formed at the second recessed structure 211b1 of the lower case 210b. In addition, the second cylinder 215b may be located between the 26 lower hollow tubes 211b. Further, the outer surface of the second cylinder 215b may be connect to the inner surface of the lower hollow tube 211b.

Thus, according to this configuration of the present disclosure, since the guide unit 215 includes the first cylinder 215a and the second cylinder 215b, the guide unit 215 may have a suitable form capable of guiding the plurality of cylindrical battery cells 100 to be inserted into the plurality of hollow tubes 211. Thus, the guide unit 215 may help to smoothly perform the manufacturing process of the battery module 200.

Moreover, the second cylinder 215b may be configured to support one horizontal surface of the cylindrical battery cell 100 such that the plurality of cylindrical battery cells 100 mounted to the lower case 210b are kept to stand upright in a direction perpendicular to the ground.

For example, as shown in FIG. 6, in a state where one cylindrical battery cell 100 is located between the three second cylinders 215b and inserted into the lower hollow tube 211b, the three second cylinders 215b may support three points (triangle points) of the horizontal outer surface of the cylindrical battery cell 100 toward the cylindrical battery cell 100.

Conversely, if the plurality of cylindrical battery cells 100 are mounted and accommodated in the upper case 210a before the lower case 210b, the first cylinder 215a may be configured to support one horizontal surface of the cylindrical battery cell 100 so the plurality of cylindrical battery cells 100 mounted to the upper case 210a maintain the vertically standing form in a direction perpendicular to the ground.

Thus, according to this configuration of the present disclosure, since the first cylinder 215a or the second cylinder 215b is provided to maintain the standing state of the plurality of cylindrical battery cells 100, while the upper case 210a and the lower case 210b are being coupled, it is possible to effectively prevent the plurality of cylindrical battery cells 100 from being erroneously inserted into the plurality of hollow tubes 211. Accordingly, it is possible to shorten the manufacturing time of the battery module 200 and to prevent damage or explosion of the plurality of cylindrical battery cells 100 due to an external shock during the manufacturing.

Figure 9:
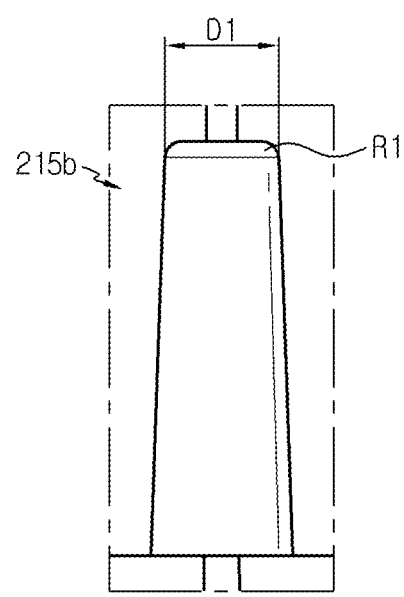
FIG. 9 is a partial side sectional view schematically showing a portion B of FIG. 7 in an enlarged form.

FIG. 9 is a partial side sectional view schematically showing a portion B of FIG. 7 in an enlarged form.

With reference to FIG. 9 along with FIGS. 5 and 6, the cylindrical form of the first cylinder 215a or the second cylinder 215b may have a cylinder diameter gradually decreasing toward a terminal portion thereof at which the cylinder diameter protrusively extends. For example, as shown in FIGS. 6 and 9, the second cylinder 215b formed at the second recessed structure 211b1 of the lower case 210b may have a cylinder diameter gradually decreasing toward the upper end thereof.

For example, as shown in FIG. 5, the first cylinder 215a formed at the first recessed structure 211a1 of the upper case 210a may have a cylinder diameter gradually decreasing toward the upper end.

Thus, according to this configuration of the present disclosure, since the first cylinder 215a or the second cylinder 215b has a cylinder diameter D1 gradually decreasing toward the terminal portion at which the cylindrical form thereof protrusively extends, even when the direction in which the plurality of cylindrical battery cells 100 are inserted is not vertical but inclined, it is possible to suitably guide the plurality of cylindrical battery cells 100 to be inserted into the plurality of hollow tubes 211 along the horizontal outer surface of the first cylinder 215a or the second cylinder 215b.

In addition, the terminal portion at which the cylindrical form of the first cylinder 215a and the second cylinder 215b protrusively extend may be rounded at an edge R1 thereof. For example, as shown in FIG. 9, the second cylinder 215b formed at the second recessed structure 211b1 of the lower case 210b may be not angled but rounded (curved) at the edge of the upper end thereof.

Further, the edge R1 of the terminal portion at which of the cylindrical form protrusively extends may be formed with a chamfer (not shown) in an oblique direction. For example, the second cylinder 215b formed at the second recessed structure 211b1 of the lower case 210b may not be angled but be chamfered at the edge R1 of the upper end thereof. That is, the chamfer may be formed by chamfering the edge formed at the upper end of the second cylinder 215b.

Thus, according to this configuration of the present disclosure, since the edge R1 of the terminal portion of the first cylinder 215a or the second cylinder 215b at which the cylindrical form protrusively extend is rounded or chamfered, when the end of the cylindrical battery cells 100 collides with the terminal portion of the first cylinder 215a or the second cylinder 215b, it is possible to guide the plurality of cylindrical battery cells 100 to be smoothly inserted into the plurality of hollow tubes 211 along the outer surface of the first cylinder 215a or the second cylinder 215b. Accordingly, it is possible to effectively prevent the damage of the plurality of cylindrical battery cells 100 that may occur in the process of inserting the plurality of cylindrical battery cells 100 into the plurality of hollow tubes 211 of the module housing 210, thereby improving the yield of the battery module 200.

Figure 10:
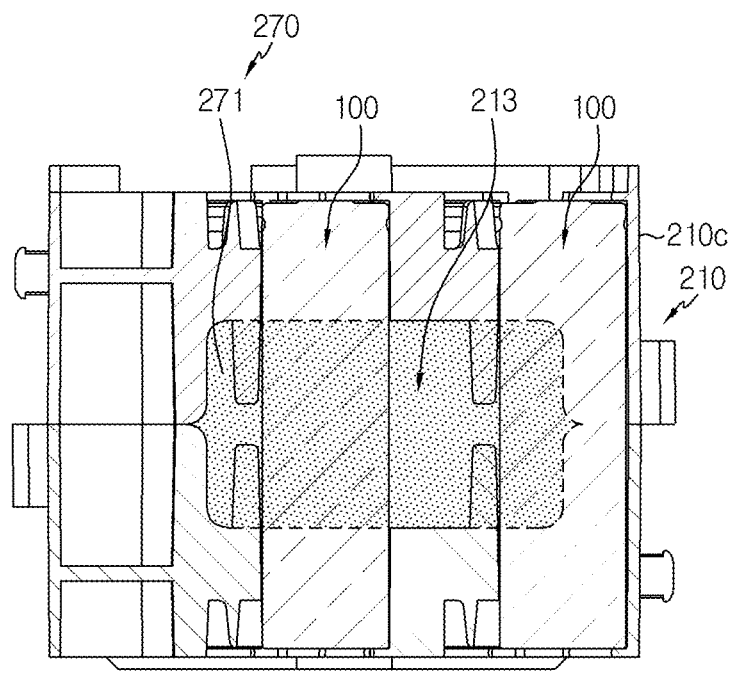
FIG. 10 is a side sectional view schematically showing an internal configuration of a battery module according to another embodiment of the present disclosure.

FIG. 10 is a side sectional view schematically showing an internal configuration of a battery module according to another embodiment of the present disclosure.

With reference to FIG. 10, the battery module 200B may further include a cooling member 270 disposed in the space of the cavity 213.

Specifically, the cooling member 270 may include a thermally conductive adhesive 271 that contains an electrically insulating material and/or a thermally conductive material at least partially. In detail, the thermally conductive adhesive 271 may include a polymer resin and a filler with high thermal conductivity. For example, the polymer resin may be a poly siloxane resin, a polyamide resin, a urethane resin or an epoxy resin. In addition, the thermally conductive adhesive 271 may include an adhesive material. For example, the adhesive material may be a material such as acrylic, polyester, polyurethane, rubber or the like.

For example, as shown in FIG. 10, the battery module 200 may further include a cooling member 270 disposed in the space of the cavity 213 and having the thermally conductive adhesive 271. In addition, the thermally conductive adhesive 271 may be configured to contact the horizontal outer surface of the plurality of cylindrical battery cells 100 by filling the space of the cavity 213.

Thus, according to this configuration of the present disclosure, since the cooling member 270 disposed in the space of the cavity 213 is further provided, the heat generated from the plurality of cylindrical battery cells 100 during charging and discharging of the battery module 200 may be effectively absorbed and quickly transferred to the outer sidewall 210c of the module housing 210. Accordingly, the battery module 200 of the present disclosure may effectively extend the battery life by improving the heat dissipation characteristics.

Meanwhile, with reference to FIG. 2 again, the module housing 210 may include at least one fixing tube 219 extending in the vertical direction. Specifically, the upper case 210a may include at least one fixing tube 219 extending in the vertical direction. In addition, the lower case 210b may include at least one fixing tube 219 extending in the vertical direction.

For example, as shown in FIG. 2, two fixing tubes 219 may be provided to each of both left and right ends of the upper case 210a. Further, two fixing tubes 219 may be provided to each of both left and right ends of the lower case 210b.

Moreover, the battery module 200 may further include a bushing 280 inserted into the fixing tube 219 and a long bolt (not shown) inserted into the bushing 280 in the vertical direction. Here, the bushing 280 may be a tube into which the long bolt or the like is inserted. In addition, the bushing 280 may be a metal with excellent thermal conductivity and mechanical rigidity. For example, the bushing 280 may be steel or stainless steel.

For example, as shown in FIG. 2, two bushings 280 may be respectively inserted into the two fixing tubes 219 of the upper case 210a. In addition, two bushings 280 may be respectively inserted into the two fixing tubes 219 of the lower case 210b.

Further, the two bushings 280 of the upper case 210a may be disposed to be connected to the two bushings 280 of the lower case 210b, respectively.

Thus, according to this configuration of the present disclosure, since the fixing tube 219 is provided to the module housing 210 and the bushing 280 is inserted into the fixing tube 219, a long bolt may be easily inserted in order to stack and fix the plurality of battery modules 200 in the vertical direction or to fix the battery modules 200 to the ground.

Figure 11:
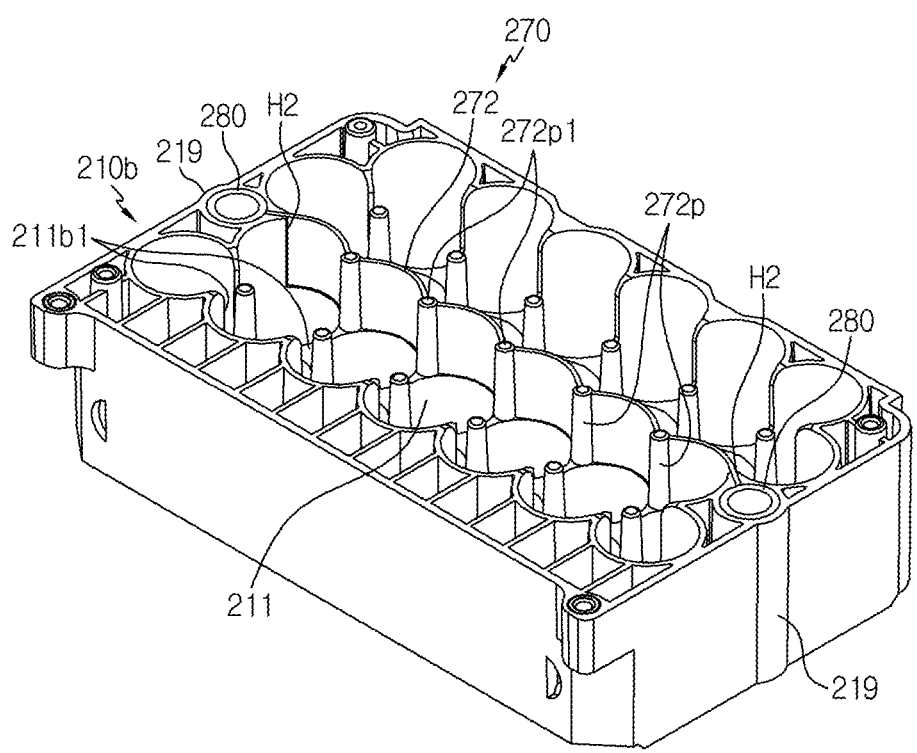
FIG. 11 is a perspective view schematically showing some components of the battery module according to another embodiment of the present disclosure.

FIG. 11 is a perspective view schematically showing some components of the battery module according to another embodiment of the present disclosure.

With reference to FIG. 11 along with FIG. 2, the cooling member 270 may include a metal member configured to be connected to the bushing 280. For example, the metal may be a nickel alloy, a copper alloy or an aluminum alloy with excellent thermal conductivity. Further, the cooling member 270 may include a body portion 272 with a plate shape that has relatively narrow upper and lower surfaces and relatively wide horizontal side surfaces. In addition, the body portion 272 of the cooling member 270 may be configured to be connected to the horizontal outer surface of the bushing 280 and extend in the horizontal direction.

That is, the body portion 272 of the cooling member 270 may extend in the horizontal direction from the outer surface of the bushing 280 to contact the outer surface of the plurality of cylindrical battery cells 100. In addition, the body portion 272 of the cooling member 270 has a plate shape bent along the outer surface of the plurality of cylindrical battery cells 100 so as to be connected to the horizontal outer surface of the plurality of cylindrical battery cells 100

For example, as shown in FIG. 11, both ends of the body portion 272 of the cooling member 270 may be connected to two bushings 280 inserted into the fixing tube 219 of the lower case 210b, respectively. In addition, the body portion 272 of the cooling member 270 may have a plate shape whose one end is connected to the bushing 280 located at a left side and the other end is connected to the bushing 280 located at a right side. At this time, an opening H2 may be formed in the module housing 210 so that the body portion 272 of the cooling member 270 is inserted in the horizontal direction. That is, the body portion 272 of the cooling member 270 may be inserted through the opening H2 formed in the inside (the cavity) 213 of the module housing 210 so as to be connected to the bushing 280.

Thus, according to this configuration of the present disclosure, since the body portion 272 of the cooling member 270 is connected to the bushing 280 and extends in the horizontal direction from the outer surface of the bushing 280 to contact the outer surface of the plurality of cylindrical battery cells 100, during the charging and discharging of the battery module 200, the generated heat may be effectively transferred to the bushing 280 having high thermal conductivity and high heat capacity. Accordingly, the cooling efficiency for the battery module 200 may be effectively increased. Moreover, in the present disclosure, since the cooling member 270 is connected to two or more bushings 280, the mechanical stiffness of the module housing 210 may be effectively increased, thereby effectively reducing damage to the internal configuration due to the impact applied to the battery module 200.

In addition, at least one guide protrusion 272p may be formed on the cooling member 270. Specifically, the guide protrusion 272p may be formed to guide the cylindrical battery cell 100 to be inserted into the hollow tube 211. That is, the guide protrusion 272p may have a cylindrical form protrusively extending inwards. For example, the guide protrusion 272p may have a cylindrical form identical or similar to the form of the second cylinder 215b shown in FIG. 9.

That is, the guide protrusion 272p may have a cylinder diameter gradually decreasing toward a terminal portion thereof at which the guide protrusion 272p protrusively extends. Further, the guide protrusion 272p may be rounded at an edge of the terminal portion 272p1 at which the cylindrical form protrusively extends, to form a curved surface. Alternatively, the terminal portion of the cylindrical form may be chamfered.

For example, as shown in FIG. 11, the body portion 272 of the cooling member 270 may be provided to the second recessed structure 211b1 of the lower case 210b. Here, both ends of the body portion 272 of the cooling member 270 may be connected to the two bushing 280. In addition, the plate shape of the body portion 272 may be bent along the outer surface of the plurality of cylindrical battery cells 100. Further, five guide protrusions 272p protrusively extending upward and having a cylindrical form may be formed at the body portion 272 of the cooling member 270.

Meanwhile, a battery pack (not shown) according to an embodiment of the present disclosure may include at least one battery module 200 as described above. The battery pack may further include a pack case (not shown) for accommodating the battery module 200, and various devices (not shown) for controlling the charge and discharge of the battery module 200, such as a battery management system (BMS), a current sensor and a fuse, in addition to the battery module 200.

In addition, the battery pack according to an embodiment of the present disclosure may be applied to a vehicle such as an electric vehicle and a hybrid electric vehicle. That is, the vehicle according to an embodiment of the present disclosure may include the battery pack according to an embodiment of the present disclosure.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

It will be apparent to those skilled in the art that various modifications and variations can be made in the battery module including a module housing of the present disclosure without departing from the technical idea or scope of the disclosure. Thus, it is intended that the present disclosure cover the modifications and variations of this disclosure provided they come within the scope of the appended claims and their equivalents.

REFERENCE SIGNS

| | |
|---|---|
| 200: battery module | 100: cylindrical battery cell |
| 111, 112: electrode terminal | |
| 210: module housing | 210a, 210b: upper case, lower case |
| 211, 211a, 211b: hollow tube, upper hollow tube, lower hollow tube | |
| 215, 215a, 215b: guide unit, first cylinder, second cylinder | |
| 213: cavity | |
| 270: cooling member | 272: body portion |
| 272p: guide protrusion | 280: bushing |

What is claimed is:

1. A battery module, comprising:
   a plurality of cylindrical battery cells arranged in a horizontal direction and each standing upright in a vertical direction;
   a module housing including outer sidewalls configured to form an inner space, a plurality of hollow tubes having inner sidewalls located in the inner space and extending in the vertical direction to accommodate the plurality of cylindrical battery cells therein, and a cavity formed by opening at least a part of vertical central portions of the inner sidewalls of the plurality of hollow tubes to form an empty space therein; and
   a cooling member in the space of the cavity,
   wherein the module housing includes at least one fixing tube extending in the vertical direction,
   wherein the battery module further comprises a bushing inserted into the fixing tube, and
   wherein the cooling member is connected to the bushing and extends in the horizontal direction from an outer surface of the bushing to contact an outer surface of the plurality of cylindrical battery cells.

2. The battery module according to claim 1, wherein the module housing includes:
   an upper case having a plurality of upper hollow tubes configured to accommodate an upper portion of the plurality of cylindrical battery cells; and
   a lower case having a plurality of lower hollow tubes configured to accommodate a lower portion of the plurality of cylindrical battery cells,
   wherein the cavity includes a first recessed structure with at least a part of a lower surface of the upper hollow tube recessed upward and a second recessed structure with a part of an upper surface of the lower hollow tube recessed downward.

3. The battery module according to claim 2, wherein the module housing includes a guide unit in the cavity to guide the plurality of cylindrical battery cells to be inserted into the plurality of hollow tubes.

4. The battery module according to claim 3, wherein the guide unit includes:
   a first cylinder at the upper case and having a cylindrical form protrusively extending toward the lower case; and
   a second cylinder at the lower case and having a cylindrical form protrusively extending toward the upper case.

5. The battery module according to claim 4, wherein the cylindrical form of each of the first and second cylinders has a cylinder diameter gradually decreasing toward a terminal portion at which the cylindrical form protrusively extends.

6. The battery module according to claim 4, wherein a terminal portion of the cylindrical form of each of the first and second cylinders at which the cylindrical form protrusively extends is rounded or chamfered at an edge thereof.

7. The battery module according to claim 1, wherein the cooling member includes a guide protrusion protrusively extending inward and having a cylindrical form to guide the cylindrical battery cells to be inserted into the hollow tubes.

8. A battery pack, comprising the battery module of claim 1.

9. A vehicle, comprising the battery pack of claim 8.

* * * * *